(12) United States Patent
Bremner (10) Patent No.: US 11,841,374 B2
(45) Date of Patent: Dec. 12, 2023

(54) LABORATORY AUTOMATION SYSTEM IMPLEMENTING EFFICIENT PATH FOR MATERIAL AND LAB WARE TRANSFERS

(71) Applicant: Zymergen Inc., Emeryville, CA (US)

(72) Inventor: Christopher Bremner, Emeryville, CA (US)

(73) Assignee: MJNN LLC

( * ) Notice: Subject to any disclaimer, the term of this patent is extended or adjusted under 35 U.S.C. 154(b) by 0 days.

(21) Appl. No.: 17/620,033

(22) PCT Filed: Jun. 26, 2020

(86) PCT No.: PCT/US2020/039770
§ 371 (c)(1),
(2) Date: Dec. 16, 2021

(87) PCT Pub. No.: WO2020/264260
PCT Pub. Date: Dec. 30, 2020

(65) Prior Publication Data
US 2022/0260598 A1   Aug. 18, 2022

Related U.S. Application Data

(60) Provisional application No. 62/867,447, filed on Jun. 27, 2019.

(51) Int. Cl.
*G01N 35/00* (2006.01)
*G01N 35/04* (2006.01)

(52) U.S. Cl.
CPC ... *G01N 35/0092* (2013.01); *G01N 35/00722* (2013.01); *G01N 2035/0094* (2013.01);
(Continued)

(58) Field of Classification Search
CPC ......... G01N 35/00722; G01N 35/0092; G01N 35/00584; G01N 35/1011;
(Continued)

(56) References Cited

U.S. PATENT DOCUMENTS

| | | | |
|---|---|---|---|
| 6,863,362 B2 * | 3/2005 | Reichel | B01L 3/0268 347/19 |
| 8,496,875 B2 * | 7/2013 | Greenstein | B01L 9/527 422/65 |

(Continued)

FOREIGN PATENT DOCUMENTS

WO   2014053235 A1   4/2014

OTHER PUBLICATIONS

Feba Sam, Echo 550 acoustic liquid handling technology, Lerlara science, Oct. 29, 2016, 10 pages.
(Continued)

*Primary Examiner* — Shogo Sasaki
(74) *Attorney, Agent, or Firm* — Almanac IP Advisors LLP (57) ABSTRACT

Systems, methods and computer-readable media are provided for determining a sequential ordering of predefined transfers for transferring an object from source points of a source array to destination points of a destination array in a laboratory automation system. For each transition to a next transfer, first and second component travel costs between current and next transfer positions are determined. A transition travel cost is determined from the first and second component travel costs. The cost of each sequential ordering of the predefined transfers is based upon an aggregate of the transition travel costs for each ordering of the transfers. The resolved sequential ordering may be based upon the sequential ordering that has the lowest cost.

36 Claims, 5 Drawing Sheets

(52) U.S. Cl.
CPC .............. *G01N 2035/046* (2013.01); *G01N 2035/0472* (2013.01); *G01N 2035/0482* (2013.01)

(58) Field of Classification Search
CPC ... G01N 2035/0094; G01N 2035/0472; G01N 2035/046; G01N 2035/0482
See application file for complete search history.

(56) References Cited

U.S. PATENT DOCUMENTS

| | | | | |
|---|---|---|---|---|
| 2002/0102555 | A1* | 8/2002 | Bruce | G01N 35/10 435/6.13 |
| 2003/0161761 | A1* | 8/2003 | Williams | G01N 35/028 422/63 |
| 2004/0120855 | A1* | 6/2004 | Reichel | G01N 35/028 422/67 |
| 2009/0218481 | A1* | 9/2009 | DeWalch | H01J 49/26 250/281 |
| 2013/0029856 | A1* | 1/2013 | Kelso | G01N 35/1011 435/6.12 |
| 2017/0175184 | A1* | 6/2017 | Drmanac | G01N 15/1404 |
| 2022/0260598 | A1* | 8/2022 | Bremner | G01N 35/00722 |

OTHER PUBLICATIONS

Labcyte, Echo Liquid Handlers, Brochure, Version 3.0, Jan. 2019, 12 pages.
Labcyte, Echo Plate Reformat Application, Quick Start Guide, Version 1.7, Mar. 2018, 3 pages.
Labcyte, Echo Plate Reformat Application, User Guide, Version 1.7, Mar. 2018, 109 pages.
Labcyte, Echo Software Applications, Brochure, Version 3.0, Jun. 2018, 8 pages.
Peddi, et al., Efficient and Effective Path for Automated Dispensing of Bio-Precipitant Solutions, Proceedings of the 2005 IEEE, International Conference on Automation Science and Engineering, Edmonton, Canada, Aug. 1 & 2, 2005, 61-66.
International Search Report and Written Opinion for PCT Application No. PCT/US2020/039770 dated Sep. 3, 2020, 7 pages.
Kanigowska et al. "Smart DNA Fabrication Using Sound Waves: Applying Acoustic Dispensing Technologies to Synthetic Biology," J Lab Autom. Feb. 2016;21(1):49-56. doi: 10.1177/2211068215593754. Epub Jul. 10, 2015. [retrieved on Aug. 16, 2020]. Retrieved from the Internet: pp. 49-56.
Whitehead, "A Software System for Automating Lab Experiments with Liquid-Handling Robots," Diss. Eth No. 24645, Eth Zurich, https://doi.org/10.3929/ethz-b-000244796, 2017 [retrieved on Aug. 16, 2020]. Retrieved from the Internet: pp. 1-20.

* cited by examiner

LABORATORY AUTOMATION SYSTEM IMPLEMENTING EFFICIENT PATH FOR MATERIAL AND LAB WARE TRANSFERS

CROSS-REFERENCE TO RELATED APPLICATIONS

This application is a national stage entry of International Application No. PCT/US2020/039770, filed on 26 Jun. 2020, which claims the benefit of priority to U.S. Application No. 62/867,447, filed Jun. 27, 2019, both of which are incorporated by reference herein in their entirety.

This application is related to: International Application No. PCT/US2017/029725 (U.S. Patent Pub. No. US 2017/0316353), filed on Apr. 26, 2017, which claims the benefit of priority to U.S. application Ser. No. 15/140,296, filed on Apr. 27, 2016; U.S. Pat. No. 9,988,624; and International Application No. PCT/US2018/057583 (Pub. No. WO/2019/084315), which claims priority to U.S. Application No. 62/577,615, filed Oct. 26, 2017, all which are hereby incorporated by reference herein in their entirety.

BACKGROUND

Field of the Disclosure

The present disclosure is generally directed to high-throughput genomic engineering of organisms, and, more particularly, to reducing the travel cost (e.g., path distance) of multiple liquid transfers between source and destination points on source and destination arrays, respectively.

Description of Related Art

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Microbe engineering enables the generation of novel chemicals, advanced materials, and pharmaceuticals. A strain design company, on behalf of itself or third parties, may modify a previously described DNA segment to enhance the metabolic production of a microbial host by improving output properties such as yield, productivity, growth rate, and titer.

One approach to optimizing the performance of an incompletely understood system, such as a living cell, is to test many different genetic modifications and empirically determine which perform best. To explore high throughput screening in this large combinatorial space, laboratory systems may employ robotic liquid handlers to transfer nucleotides, enzymes (e.g., DNA polymerases), and other reagents into wells of a microplate (otherwise referred to herein as a "plate") that contain microorganisms, such as microbes, having genomes to be modified. The engineered organisms may then be fermented to produce a product of interest.

One type of liquid handler is an acoustic liquid handler, such as those in the ECHO® series provided by LABCYTE, INC. Acoustic drop ejection is a technology which uses highly focused sound energy to cause an ultra-small (e.g., 2.5 nL, 25 nL) droplet to dislocate from a source well and be deposited into a destination well. To transfer a higher volume of liquid (an example of an "object," as used herein), multiple droplets may be transferred from the source well to the destination well. The ECHO® 550, for example, can transfer liquids from either 384 or 1536 well source plates to 96, 384, 1536 and 3456 well destination plates. The handler can also transfer liquids to other arrays, such as slides.

A commercially available path determination software tool for acoustic liquid handling transfers is the LABCYTE ECHO® Plate Reformat application. This software can substantially reduce the total runtime for an example set of transfers by modifying the order in which the transfers occur.

Others have considered the issue of developing an efficient path for dispensing liquids. For example, A. Peddi, et al., Efficient and Effective Path for Automated Dispensing of Bio-Precipitant Solutions, *Proceedings of the 2005 IEEE International Conference on Automation Science and Engineering*, Aug. 1-2, 2005 ("Peddi"), explores reducing the path length for a dispensing tip of a robotic system that delivers solutions into wells. The paper concludes that a technique for solving the traveling salesman problem is the best heuristic.

Compared to conventional approaches, it is desired to reduce the cost (e.g., time) for a set of array-to-array transfers in a liquid handling system, such as acoustic liquid handling system.

SUMMARY OF THE DISCLOSURE

Liquid handlers form a critical part of an automated robotic system used in the high throughput fabrication and analysis of synthetic microorganisms. Liquid handlers may be used to transfer volumes of liquid from wells in a source plate to wells in a destination plate. In particular, acoustic liquid handlers employ an inverted destination plate positioned over a source plate, and then use an acoustic transducer to induce the formation of droplet of liquid that "jumps" up from the source plate to the destination plate.

In a typical application, a liquid handler is given a list of transfers that outlines the source and destination array points (e.g., plate wells) for each transfer. Based on the layout of this transfer map (pick list), the order in which transfers occur can greatly affect the total amount of time it takes to execute all the transfers. Embodiments of the disclosure determine the order for series of liquid transfers to substantially reduce the total transfer cost (e.g., time) as compared to conventional techniques, or even minimize the total transfer cost if the algorithm is given enough computation time.

Embodiments of the disclosure provide cost functions that are used to determine a low-cost sequential ordering of transfers. To determine such an ordering, embodiments of the disclosure provide the costs as inputs to a commercially available path determination software tool, such as a Traveling Salesman Problem ("TSP") solver software tool. According to embodiments of the disclosure, the cost functions are designed for acoustic liquid handlers in which there are two moving components, such as the acoustic transducer and the destination plate. In other acoustic liquid handlers, such as the EDC BIOSYSTEMS™ ATS GEN5, the source and destination plates move while the transducer remains fixed.

According to embodiments of the disclosure, a liquid transfer occurs when source and destination points are aligned at a liquid transfer position (also referred to as a "node" herein). According to embodiments of the disclosure, for an acoustic liquid transfer, the acoustic transducer is also aligned with the source well position. According to embodiments of the disclosure, the first and second components (e.g., the transducer and the destination plate) move along separate paths to the new liquid transfer position.

A "tour" refers to a sequential ordering of the liquid transfers. Each transition from one liquid transfer position to another liquid transfer position incurs a cost (e.g., distance). According to embodiments of the disclosure, separate costs are incurred for the separate first and second component paths. According to embodiments of the disclosure, the cost for a transition from one liquid transfer position to the next comprises the maximum of the travel costs for the first and second components. According to embodiments of the disclosure, the cost for a tour is the sum of the costs for each transition between liquid transfer positions along the tour. Embodiments of the disclosure select the tour with the lowest cost.

More generally, embodiments of the disclosure compute cost functions for a laboratory automation system with acoustic transducers or other actuators in which two components move while a third component remains fixed, where the two movable components may, for example, be any two of the following three components: a source array, a destination array, or an actuator. Each array (e.g., plate, tube rack) may be an arrangement of points (e.g., volumes or areas in the x-y plane) from or to which liquid volumes or other "objects" are transferred, such as a plate, tube rack, or other labware having wells, tubes, or other points, respectively.

Embodiments of the disclosure provide computer-implemented methods, systems, and non-transitory computer-readable media for determining a sequential ordering of a plurality of predefined transfers for transferring an object (e.g., liquid volume, tube, powder) from a plurality of source points (e.g., wells, tubes) of a source array (e.g., plate, tube rack) to a plurality of destination points of a destination array, wherein a laboratory automation system (e.g., liquid handler, tube sorter, powder handler) includes at least a first component and a second component of the following three components: a source array, a destination array, or an actuator (e.g., acoustic, pneumatic, vibratory).

As described herein, (a) for each unique transition to a next transfer of the plurality of predefined transfers, wherein each transfer corresponds to a transfer position, Embodiments of the disclosure (i) determine a first component travel cost of the first component between a current transfer position and a next transfer position corresponding to the next transfer, wherein the current transfer position corresponds to positioning of a current source point with respect to a current destination point for a current transfer of the plurality of predefined transfers, the next transfer position corresponds to positioning of a next source point with respect to a next destination point for the next transfer; (ii) determine a second component travel cost of the second component between the current transfer position and the next transfer position; and (iii) determine a transition travel cost, of a plurality of transition travel costs, for the transition as the maximum of the first component travel cost and the second component travel cost. Embodiments of the disclosure (b) determine a resolved sequential ordering of the plurality of predefined transfers based at least in part upon the plurality of transition travel costs.

According to embodiments of the disclosure, each tour of a plurality of tours comprises a unique sequential ordering of the plurality of predefined transfers, the method further comprising determining the cost of each tour based at least in part upon an aggregate of the transition travel costs for the tour. According to embodiments of the disclosure, the plurality of tours corresponds to all combinations of sequential ordering of the plurality of predefined transfers. According to embodiments of the disclosure, the cost of each tour comprises a sum of the transition travel costs for the tour. According to embodiments of the disclosure, determining a resolved sequential ordering is based at least in part upon the tour that has the lowest cost. According to embodiments of the disclosure, determining the resolved sequential ordering of the plurality of predefined transfers comprises solving the traveling salesman problem.

According to embodiments of the disclosure, the laboratory automation system comprises a liquid handler, the object is a liquid, and the first and second components travel according to the resolved sequential ordering. According to embodiments of the disclosure, the actuator is an acoustic transducer.

According to embodiments of the disclosure, the first and second components are movable and a third component of the three components remains fixed. According to embodiments of the disclosure, a third component of the three components is also positioned at the next transfer position for the next transfer. According to embodiments of the disclosure, positioning comprises alignment. According to embodiments of the disclosure, each transition travel cost is a distance, or a function of distance and travel time.

According to embodiments of the disclosure, the destination array resides in a plane parallel to a plane in which the source array resides. According to embodiments of the disclosure, the source and destination arrays are plates and the source and destination points are wells. According to embodiments of the disclosure, the first and second components are the actuator and the destination plate, respectively.

Embodiments of the disclosure further comprise moving the first and second components according to the resolved sequential ordering. Embodiments of the disclosure further comprise assembling at least one nucleotide sequence based at least in part upon moving the first and second components according to the resolved sequential ordering. Embodiments of the disclosure further comprise manufacturing a product of interest based at least in part upon at least one nucleotide sequence assembled by moving the first and second components according to the resolved sequential ordering.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

As used herein the terms "organism" "microorganism" or "microbe" should be taken broadly. These terms are used interchangeably and include, but are not limited to, the two prokaryotic domains, Bacteria and Archaea, as well as certain eukaryotic fungi and protists, as well as yeasts.

Embodiments of the disclosure provide systems, methods, and computer-readable media storing instructions for determining a sequential ordering of liquid transfers (e.g., acoustic liquid transfers) that is more efficient than the ordering methodology employed in conventional high throughput genomic engineering systems. Embodiments of the disclosure provide cost functions from which an efficient sequential ordering may be computed.

Figure 1A:
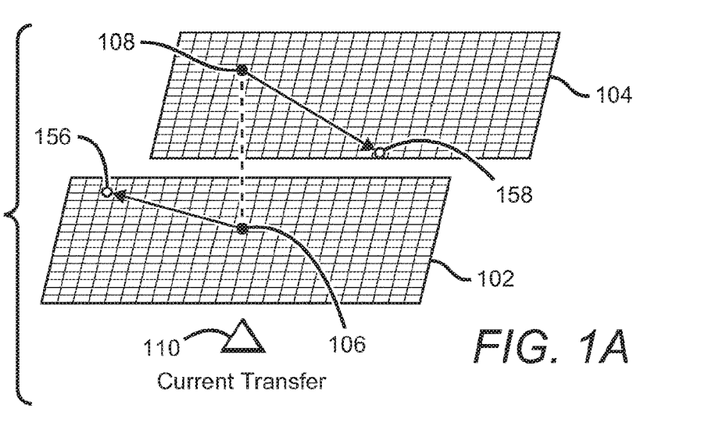
FIGS. 1A and 1B each illustrate a source plate and a destination plate in a liquid handler, according to embodiments of the disclosure.
Figure 1B:
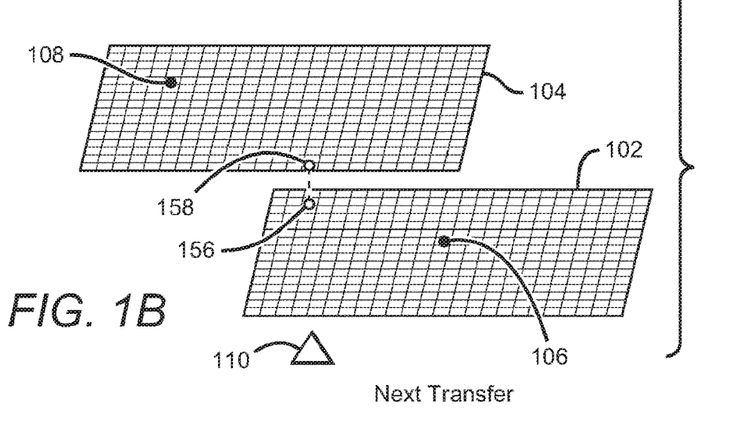

FIGS. 1A and 1B each illustrate a source plate 102 and a destination plate 104 in a liquid handler, such as the ECHO® 550, according to embodiments of the disclosure. Referring to FIG. 1A, respective source and destination wells are aligned at a liquid transfer position for a liquid transfer from a source well 106 to a destination well 108. According to embodiments of the disclosure, an acoustic transducer 110 is aligned below the source well position (at the liquid transfer position for this transfer) to cause liquid droplets to jump up from the source well 106 to the destination well 108.

Figure 2:
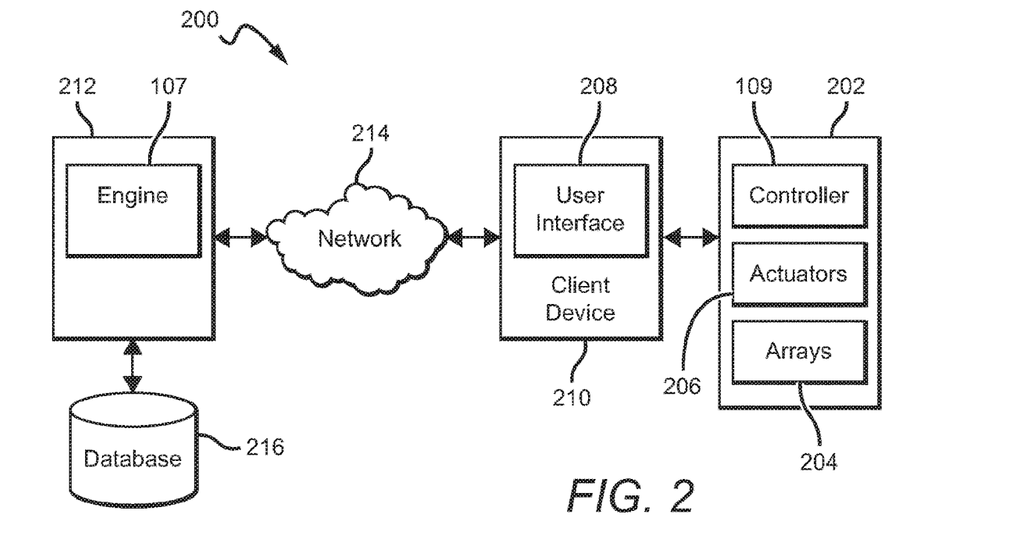
FIG. 2 illustrates a distributed system including a liquid handler, according to embodiments of the disclosure.

FIG. 2 illustrates a distributed system 200 of embodiments of the disclosure including a liquid handler 202 of embodiments of the disclosure. The liquid handler 202 includes a controller 109, arrays 204 (e.g., plates 102, 104), and at least one actuator 206 (e.g., motors) for moving the arrays 204 in at least the x-y plane and for achieving other liquid handler operations, such as liquid transfers from source array points (e.g., source wells) to destination array points (e.g., destination wells).

A user interface 208 includes a client-side interface such as a text editor or a graphical user interface (GUI). The user interface 208 may reside at a client-side computing device 210, such as a laptop or desktop computer. The client-side computing device 210 is coupled to one or more servers 212 through a network 214, such as the Internet. The client device 210 may be integrated into, or otherwise reside locally with the liquid handler 202, or reside remotely from the liquid handler 202. In the example shown in the figure, the client device 210 acts as the interface between the liquid handler 202 and server(s) 212.

The server(s) 212 are coupled locally or remotely to one or more databases 216, which may include one or more corpora of libraries including data such as pick lists, software applications such as tour optimization applications, and data concerning the assembly of nucleotide sequences. The database(s) 216 may include public databases, as well as custom databases generated by the user or others.

In embodiments, the server(s) 212 include at least one processor and at least one memory storing instructions that, when executed by the processor(s), perform operations disclosed herein, including computing costs or determining a sequential ordering of liquid transfers (or both), thereby acting as a tour determination engine 107, according to embodiments of the disclosure.

According to embodiments of the disclosure, the software and associated hardware for all the system 200 elements (e.g., tour determination engine 107, controller 109, liquid handler 202) may reside locally with the client 210 instead of at the server(s) 212, or be distributed among client 210, server(s) 212, and liquid handler 202 in any combination. In the example shown in the figure, firmware in the controller 109 may receive an output pick list from the engine 107 to cause actuators 206 to move one or more arrays 204. (In embodiments, the controller 109 may also cause a transducer or other actuator to execute a transfer between source and destination arrays 204.) In embodiments, all or parts of these computing elements may run as a cloud-based service, depicted further in FIG. 5. The controller 109 may reside, for example, at the server(s) 212 or at the liquid handler 202. The database(s) 216 may be local or remote with respect to the client 210 or distributed locally or remotely.

After the current transfer, the controller 109 uses the output pick list provided by the engine 107 to determine the next transfer. The controller 109 causes the actuators 206 to move the transducer 110 and the destination plate 104 to enable the next transfer at the next liquid transfer position, according to embodiments of the disclosure. For this transfer, the destination well 158 is moved into alignment over source well 156 at a next liquid transfer position, and transducer 119 is moved into alignment under source well 156, as shown in FIG. 1B.

Figure 3:
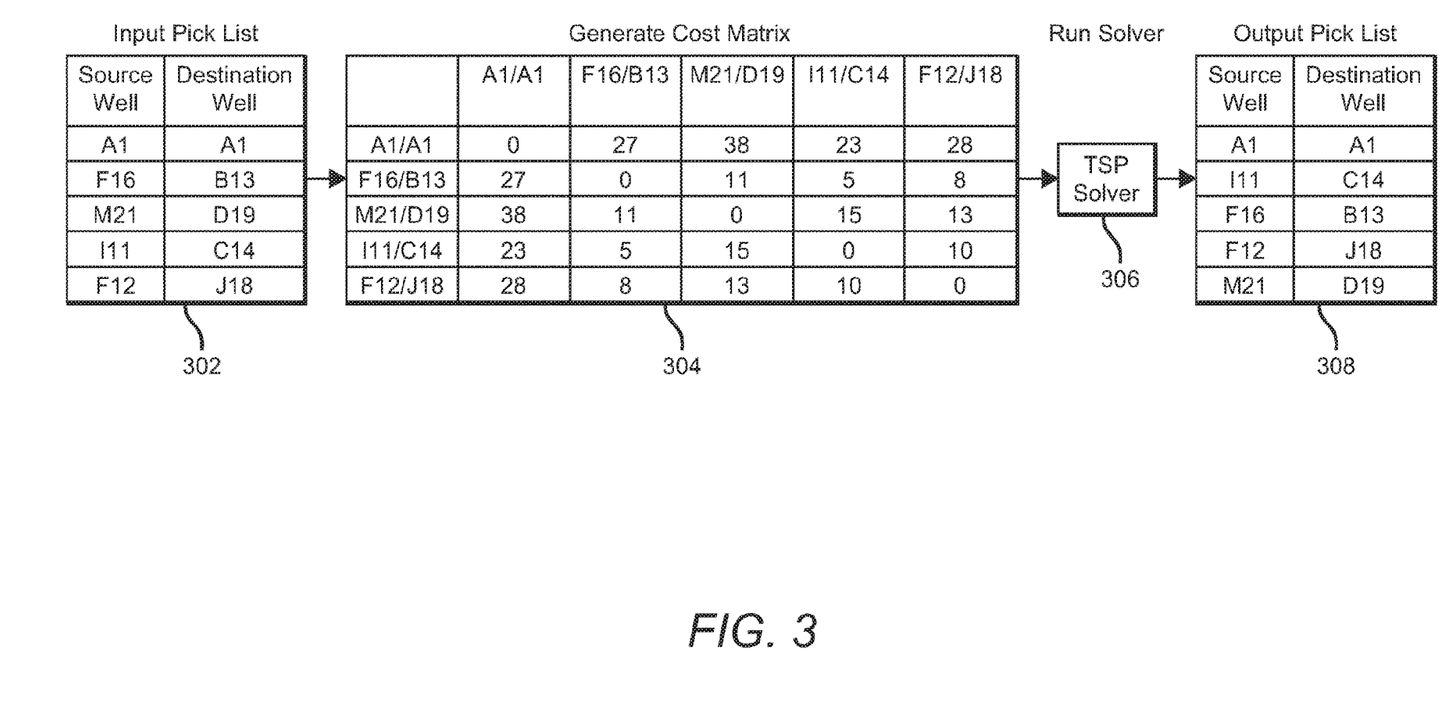
FIG. 3 illustrates a process for determining an improved, low-cost sequential liquid transfer ordering according to embodiments of the disclosure.

FIG. 3 illustrates a process for determining an improved, low-cost sequential liquid transfer ordering according to embodiments of the disclosure. A pick list 302 specifies each transfer to be made from a source point (e.g., source well) to a destination point (e.g., destination well). This simplified pick list shows five transfers. In a laboratory, a typical pick list may specify a total of 300-1500 transfers between, for example, two 384-well plates.

Each entry in the pick list 302 specifies an identification of a source point or a destination point. In the example of this pick list, each point is denoted by its x-y coordinates, where letters specify rows and numbers specify columns (e.g., A1 is the origin in standard plate terminology). Those skilled in the art will recognize that other identification indicia (e.g., standard x-y numerical coordinates) may be used to specify array point position. According to embodiments of the disclosure, the coordinates are selected so that both source and destination arrays reside in the same frame of reference. For example, the coordinates may be chosen so that from a perspective looking down on the arrays, the origin in the x-y plane is located at the lower left corner of the source array (which is facing up).

In the same example, because the destination array is mirrored about the y axis, the origin of the destination array in this frame of reference would reside at the lower right corner of the destination array when it is facing up. The lower left corner corresponds to (23, 0) in a 16-row×24-column, 384-well plate, for example. If the destination array were instead mirrored about the x axis, the origin of the destination array in the exemplary frame of reference would reside at the upper left corner of the destination array when it is facing up.

According to embodiments of the disclosure in which an acoustic transducer and a destination plate are the first and second movable components, to move from one source well to the next, the transducer 110 (corresponding to an actuator 206) travels one path (denoted here as a "transducer path" or "source path") from the current source well 106 to the next source well 156. The destination plate 104 travels another path (denoted here as a "destination path") from its current position where the current destination well 108 is aligned with the current source well 106 to its next position where the next destination well 158 is aligned with the next source well 156.

A cost matrix 304 shows an example of costs computed by the tour determination engine 107 for every transition to a new liquid transfer position, according to embodiments of the disclosure. Each cell in the cost matrix 304 represents the transition travel cost (e.g., distance) to move from a liquid transfer position represented by the matrix row header to a liquid transfer position represented by a matrix column header. Assuming that the cost is bidirectional (e.g., the distance between a first node to second node is the same as from the second node to the first node), the matrix is symmetric about its diagonal. Under this assumption and looking at only the entries above the diagonal we see that five liquid transfers can be sequentially ordered in ten unique combinations ($_5C_2=10$) having ten unique costs.

According to embodiments of the disclosure, the individual costs are used by the engine 107 itself to determine a sequential ordering of the liquid transfers ("tour") that minimizes the total cost over all tours, given applicable constraints such as available computation time. According to embodiments of the disclosure, the engine 107 determines the costs of all the unique tours based upon an aggregate (e.g., sum) of the transition travel costs for each tour. According to embodiments of the disclosure, the engine 107 determines the low-cost sequential ordering of the predefined liquid transfers as the tour having the lowest cost. According to embodiments of the disclosure, the engine 107 may call externally provided software, such as a commercially available TSP solver 306, to perform this function.

One such low-cost sequential ordering is shown in output pick list 308, where, unlike input pick list 302, the order of the rows from top to bottom represents a low-cost ordering of liquid transfers computed by embodiments of the disclosure. According to embodiments of the disclosure, due to constraints such as available computation time, the algorithm may not be able to compute the absolute minimum-cost tour over all combinations of liquid transfer ordering, and thus may use a different, sub-optimal algorithm, such as the Nearest Neighbor heuristic or other heuristic described in Peddi.

To perform all the transfers specified in the pick list, first and second components (e.g., the transducer 110 and the destination plate 104) travel respective first and second component tours through all the liquid transfer positions comprising their respective paths, according to embodiments of the disclosure. (These component tours are distinguished from a tour representing the overall sequential ordering of transitions between liquid transfers.)

An objective is to minimize, within constraints, the total cost of moving the components (e.g., destination plate 104, transducer 110) of the system to perform all the liquid transfer operations specified by the pick list. According to embodiments of the disclosure, the cost for one sequential ordering (tour) of liquid transfers is the total time to perform all the liquid transfers within one tour over all the nodes on the tour. Some factors that contribute to the cost are:

distance between source positions for each transition between nodes
  distance between destination positions for each transition between nodes
  speeds of the two moving components According to embodiments of the disclosure, each path between nodes requires movement of two components (e.g., the transducer and the destination plate). A challenge is to compute the cost of each transition between nodes based upon the movement of the component parts of the liquid handling system.

According to embodiments of the disclosure, the respective speeds of the first and second components are the same, so the cost for each transfer may be represented in terms of distance.

According to embodiments of the disclosure in which the source array 102 is fixed and the actuator 206 (e.g., acoustic transducer 110) and the destination array 104 are the first and second movable components, the engine 107 may compute the cost according to Equation 1 below. For simplicity, the equation assumes that the actuator 206 and destination array 104 speeds are the same. Under these assumptions, the cost function may be computed according to the Euclidean distances traveled by the actuator 206 and the destination plate 104.

$$\text{Cost} = \max(D_{xd}, D_{Destination}) \qquad \text{Eq. 1}$$

where $$D_{xd} = \sqrt{(Sx_i - Sx_j)^2 + (Sy_i - Sy_j)^2}$$

$$D_{Destination} = \sqrt{((Sx_i - Sx_j) - (Dx_i - Dx_j))^2 + ((Sy_i - Sy_j) - (Dy_i - Dy_j))^2}$$

$D_{xd}$ is the cost (e.g., distance) incurred by the actuator (e.g., transducer), $D_{Destination}$ is the cost incurred by the destination array, $Sx_i$ is the x coordinate of the source point (e.g., well) in the reference frame during the $i^{th}$ transfer, $Sy_i$ is the y coordinate of the source point during the $i^{th}$ transfer, $Dx_i$ is the x coordinate of the destination point (e.g., well) during the $i^{th}$ transfer, and $Dy_i$ is the y coordinate of the destination point during the $i^{th}$ transfer, and index j is the index for another transfer, e.g., the transfer immediately following the $i^{th}$ transfer.

The cost for a transition between consecutive liquid transfer positions is the maximum of the two cost functions because the liquid handler 202 must wait for the slowest one of the moving components (e.g., the transducer or the destination plate) to complete its positioning before the handler can execute the liquid transfer.

According to embodiments of the disclosure, after the engine 107 computes the costs for every combination of transitions between nodes for the source and destination points (e.g., wells), the engine 107 then may compute a low-cost sequential ordering of transfers using a known solution. For example, the engine 107 may employ a publicly available software tool for solving the traveling salesman problem, such as that found in the GOOGLE OR-tools software suite for combinatorial optimization.

The output pick list 308 represents the tour having the lowest cost. The transfers may be used for a number of objectives, such as assembly of nucleotide sequences. The engine 107 may provide the output pick list 308 to the controller 109. In response, the controller 109 signals the actuators 206 to move two out of the following three system components: source array, actuator, destination array, in the prescribed order to achieve the desired objective.

According to embodiments of the disclosure in which the movable components (e.g., transducer and destination plate) move in the x and y axes at speeds dependent upon each other, the engine 107 may compute the cost function according to Equation 2 below. According to embodiments of the disclosure, the handler 202 includes separate actuators for x and y motion of the movable components (e.g., transducer and destination plate). According to embodiments of the disclosure, the controller 109 actuates the x and y motion at different speeds to allow for a smooth, simultaneous arrival of the two components at the liquid transfer position (node) along a straight-line path. Cost here may be measured in time, instead of distance.

For example, assume that to move the transducer 110 along a path from source well A to source well B for a liquid transfer, the transducer 110 must traverse 3 cm in the x direction and 4 cm in the y direction. The controller 109 commands the x and y actuators to move simultaneously at different speeds so the transducer 110 arrives at well B in a straight-line path. The cost (e.g., time) would be determined by the longest path (the Chebyshev distance)—4 cm.

Equation 2 reflects this scenario:

$$\text{Cost} = \max(D_{xd}, D_{Destination})$$

where $$D_{xd} = \max(|Sx_i - Sx_j|, |Sy_i - Sy_j|)$$

$$D_{Destination} = \max(|(Sx_i - Sx_j) - (Dx_i - Dx_j)|, |(Sy_i - Sy_j) - (Dy_i - Dy_j)|)$$  Eq. 2

In sum, the transducer and destination plate costs computed by Eq. 2 are determined by the longest path (which is the rate-limiting path under the applicable assumptions) in the x or y dimension.

According to embodiments of the disclosure, the algorithm for computing cost is generalized to apply to any liquid handling system in which two out of the three components of (source array, destination array, actuator) move into alignment at liquid transfer positions, while the remaining component remains fixed.

Equations 3 and 4 are generalized formulas analogous to Equations 1 and 2, respectively.

$$\text{Cost} = \max(D_{C1}, D_{C2})$$

$$D_{C1} = \sqrt{((Sx_i - Sx_j) - K_T K_S (Dx_i - Dx_j))^2 + ((Sy_i - Sy_j) - K_T K_S (Dy_i - Dy_j))^2}$$

$$D_{C2} = \sqrt{((Dx_i - Dx_j) - K_T K_D (Sx_i - Sx_j))^2 + ((Dy_i - Dy_j) - K_T K_D (Sy_i - Sy_j))^2}$$

Eq. 3

$$\text{Cost} = \max(D_{C1}, D_{C2})$$

$$D_{C1} = \max(|(Sx_i - Sx_j) - K_T K_S (Dx_i - Dx_j)|, |(Sy_i - Sy_j) - K_T K_S (Dy_i - Dy_j)|)$$

$$D_{C2} = \max(|(Dx_i - Dx_j) - K_T K_D (Sx_i - Sx_j)|, |(Dy_i - Dy_j) - K_T K_D (Sy_i - Sy_j)|)$$  Eq. 4

If the actuator (e.g., transducer) moves, $K_T = 1$, else $K_T = 0$
If the source array moves, $K_S = 1$, else $K_S = 0$
If the destination array moves, $K_D = 1$, else $K_D = 0$
where
$D_{C1}$ is the cost incurred by the first component,
$D_{C2}$ is the cost incurred by the second component, According to other embodiments of the disclosure, the first and second components (e.g., transducer and destination plate) speeds differ. In that case, cost (e.g., time) is a function of both the path lengths and the speeds. Accordingly, in Eqs. 1-4, each component cost would be divided by the respective travel speeds of the component.

This disclosure provides different approaches to computing cost functions for transitions between nodes. Regardless of which solution is employed, embodiments of the disclosure provide an inventive way to determine cost functions for node transitions in a pick list or other transfer list in a laboratory automation system, provided the system has source and destination arrays and an actuator to effect a transfer at the node. Further, of the three components (source array, destination array, actuator), two must be moveable and one must be fixed.

According to embodiments of the disclosure, the laboratory automation system is a liquid handler, such as an acoustic liquid handler, where liquids are transferred from multiple points on a source array to multiple points on a destination array using an acoustic actuator.

According to other embodiments of the disclosure, the laboratory automation system is a tube sorter, such as a pneumatic tube sorter, where tubes are transferred from multiple points on a source array to multiple points on a destination array using a pneumatic actuator.

According to other embodiments of the disclosure, the laboratory automation system is a powder handler, such as a vibratory powder dispenser, where powders are transferred from multiple points on a source array to multiple points on a destination array using a vibratory actuator.

Nucleotide Sequence Assembly and Production of Product of Interest

Nucleotide Sequence Assembly

Performing liquid transfers with liquid handling robots to assemble nucleotide sequences is known in the art. For example, the transfers performed in the sequential order determined by embodiments of the disclosure may be used to transfer templates and primers into destination wells to achieve PCR reactions. The liquid handler 202 may then mix the PCR-amplified nucleotide parts with reagents, such as enzymes, to assemble the parts into nucleotide sequences. Embodiments of the disclosure may employ the Gibson or Golden Gate assembly protocols, for example. The sequences may then be circularized into plasmid form. The plasmids may then be inserted (via, e.g., electroporation) into microbes such as bacteria, which are fermented in a bioreactor to produce a product of interest, such as a desired protein.

Figure 4A:
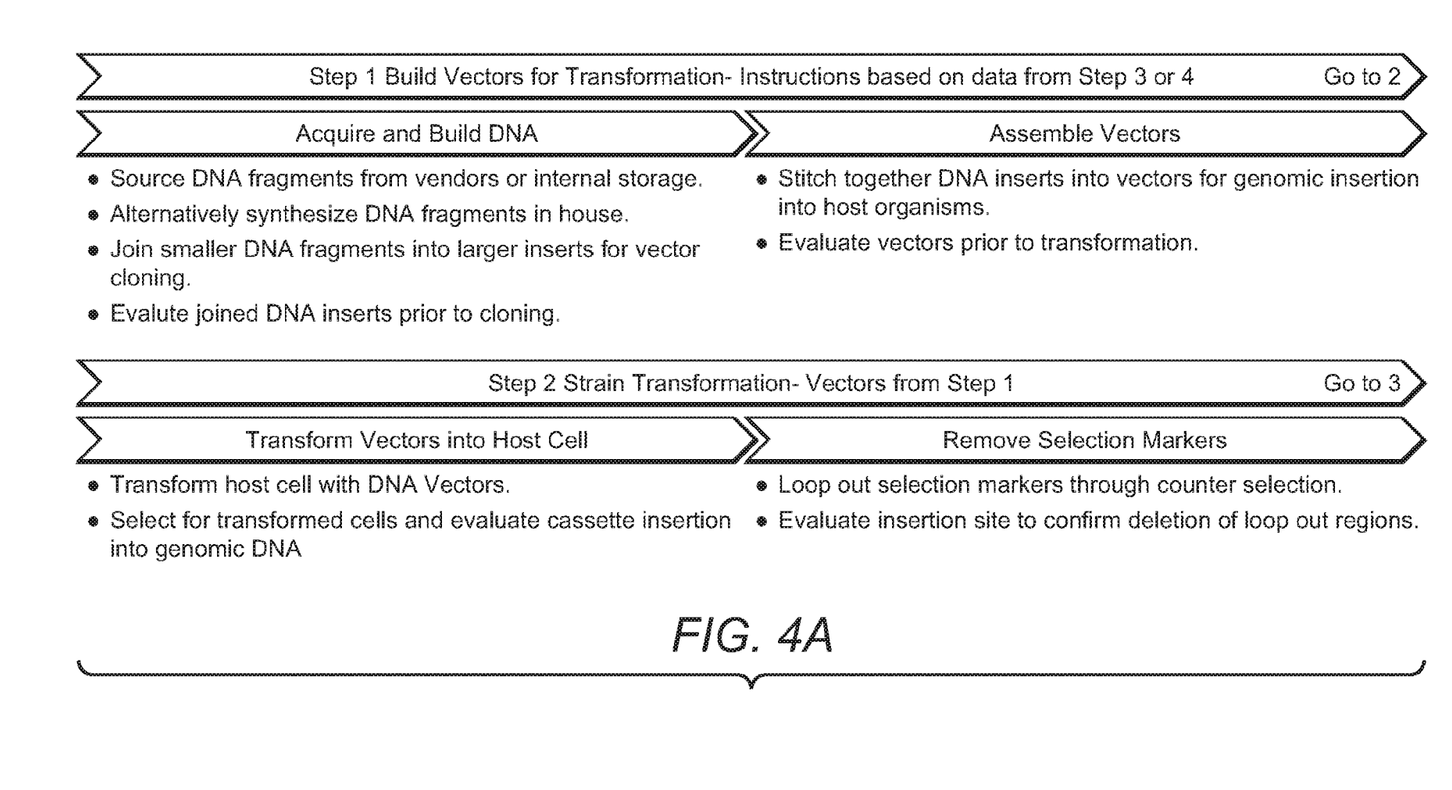
FIGS. 4A and 4B depict steps for DNA assembly, transformation, and strain screening, according to embodiments of the disclosure.
Figure 4B:
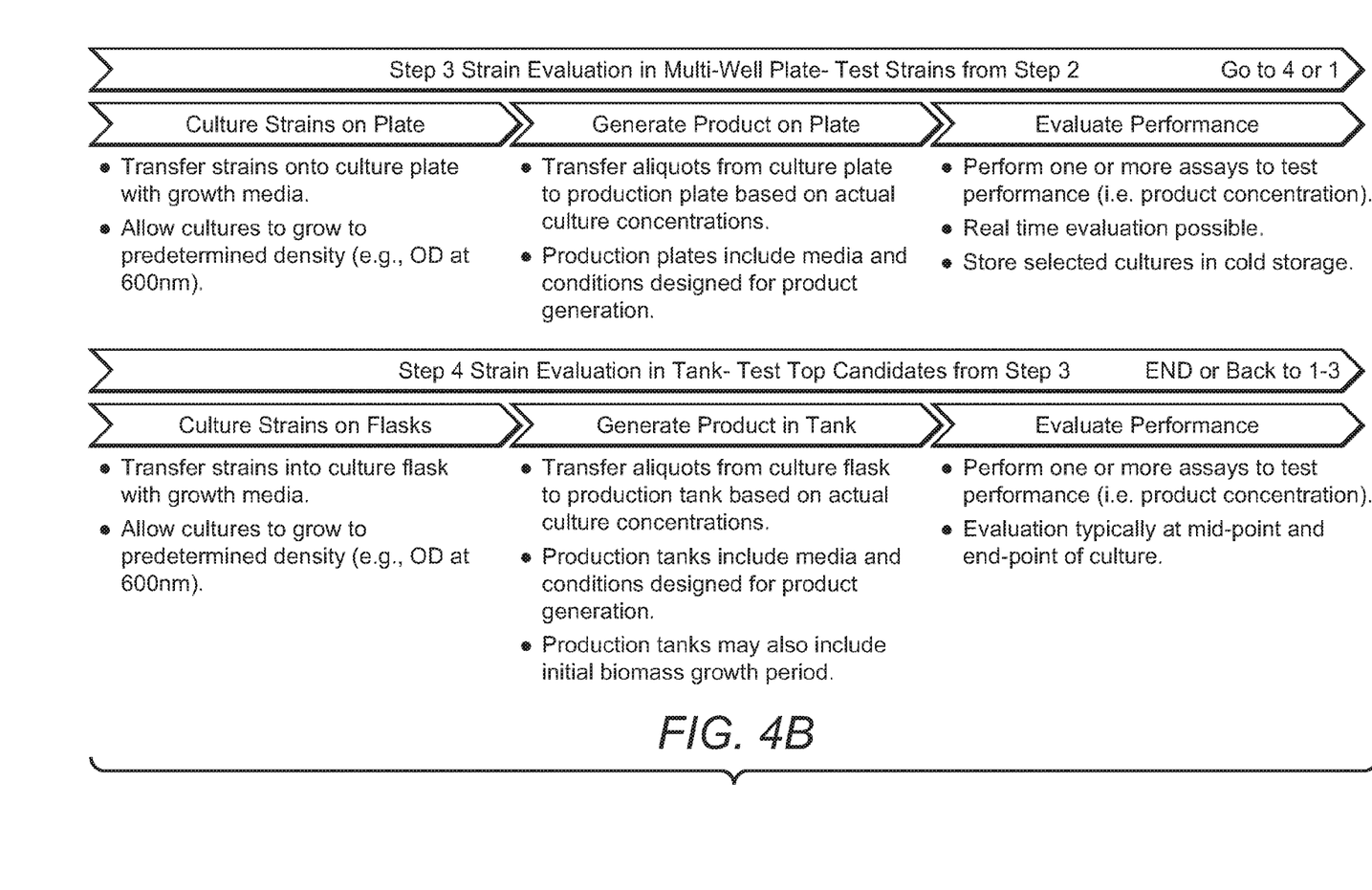

As an example, FIGS. 4A and 4B depict general steps for DNA assembly, transformation, and strain screening, according to embodiments of the disclosure. FIG. 4A depicts steps for building DNA fragments, cloning DNA fragments into vectors, transforming the vectors into host strains, and removing selection markers. FIG. 4B depicts steps for high-throughput culturing, screening, and evaluation of selected host strains. This figure also depicts optional steps of culturing, screening, and evaluating selected strains in culture tanks.

As a particular example, the use of acoustic liquid transfers for assembling nucleotides is described in, e.g., Kanigowska, et al., Smart DNA Fabrication Using Sound Waves: Applying Acoustic Dispensing Technologies to Synthetic Biology, *Journal of Laboratory Automation,* 2016, Vol. 21(1) 49-56, incorporated by reference herein in its entirety. In the exemplary process described below, the authors used the ECHO® 550 handler for DNA synthesis and assembly at the nanoliter scale.

Gibson DNA Assembly

The Gibson assembly method is one of the most used in synthetic biology, and it can assemble DNA sequences up to small genome sizes from overlapping DNA fragments in an isothermal one-pot reaction. The advantage of Gibson assembly is that it is sequence-independent and generates scarless final assembled DNA products. Typically, the Gibson assembly requires about a 40 bp homologous region between two adjacent DNA fragments, and these homologous regions are usually added to the fragments by a high-fidelity PCR. According to embodiments of the disclosure, the assembly reaction takes place in a cocktail of enzymes (the "Gibson master mix") at 50° C. for 60 min: (1) First, T5 exonulease chews back the DNA in a 5' to 3' direction from the homologous terminal ends to reveal reverse complementary single-stranded sequences between two adjacent fragments. (2) While the 5' to 3' DNA digestion proceeds, a high-fidelity DNA polymerase fills in the single-stranded DNA region. (3) Finally, Taq DNA ligase seals the nicked DNA strands, which yields the final assembled product.

Gibson Reaction Setup by ECHO® 550. Two pairs of primers (YCp2391 and YCp2392 for fragment 1, and YCp2393 and YCp2394 for fragment 2 amplify two fragments with 40 bp end homology from a red fluorescent protein (RFP)-containing plasmid pPC025, thus allowing subsequent Gibson reassembly of the plasmid. Gibson master mix (40 µL) is added to source plate 1, such as an ECHO® 384 polypropylene plate. Each DNA fragment (10 µL) is added to source plate 2, such as an ECHO® 384-well low-dead-volume plate. One-pot Gibson assembly is incubated at 50° C. for 60 minutes in a preheated PCR thermal cycler.

Golden Gate Assembly

According to embodiments of the disclosure, the Golden Gate DNA assembly method uses a combination of a TypeIIS restriction enzyme and a ligase to assemble the DNA fragments. TypeIIS enzymes (e.g., BsaI and BsmBI enzymes) are endonucleases that cut outside their recognition sites, creating 4 bp DNA overhangs. The Golden Gate DNA assembly reaction starts with a given TypeIIS endonuclease DNA digestion, leaving behind staggered cuts in the backbone and the fragment DNA. The design-imposed DNA complementarity allows annealing of the resulting "sticky ends," creating the desired plasmid construct. In the final reaction step, the T4 DNA ligase repairs the nicks to complete the DNA construction phase.

Golden Gate Reaction Setup by Echo® 550. The HcKan_P plasmid (2.8 kb, diluted to 10 ng/µl) may be used as the acceptor vector. This plasmid carries a KanR selectable marker, along with an RFP cassette flanked by a pair of outward-facing BsaI sites. The promoter pMBP1 (500 bp) is amplified directly from yeast BY4741 (MATa, leu2Δ0 met15Δ0 ura3Δ0 his3Δ1) genomic DNA with primers YCp2395 and YCp2396, and a pair of inward-facing BsaI sites is added to flank the promoter part. The PCR product is purified using a PureLink PCR purification kit (Life Technologies) and diluted to 20 ng/µl. The 4 bp overhangs are designed in such a way that the promoter can be efficiently assembled into the acceptor vector. The Golden Gate master mix is made of 35 µL T4 ligase (2000 U/µl, New England Biolabs, NEB), 35 µL BsaI-HF (NEB), 52.5 µL 10×T4 buffer (NEB), and 25 µL 200×BSA (NEB). Golden Gate assembly reactions are set up using the following cycling conditions: 15 cycles of 5 minutes at 37° C. and 10 minutes at 16° C., 5 minutes at 50° C., 10 minutes at 80° C., and hold at 4° C. Five reaction volumes arranging from 50 to 1000 nL are set up, and each reaction performed in triplicate. Golden Gate master mix (30 µL) is added to source plate 1, such as an Echo® 384 polypropylene plate. pMBP1 PCR product (10 µL) and HcKan_P vector (10 µL) are added to source plate 2, such as an Echo® 384 low-dead-volume plate.

Bacterial Transformation

According to embodiments of the disclosure, bacterial competent cells are added to each well containing an assembled product. For example, competent *E. coli* (20 µL; MAX Efficiency DH5α, Life Technologies) is added to each well of the reaction plate. According to embodiments of the disclosure, the PCR plate is incubated on ice for 20 minutes and then placed in a heat block at 42° C. for 45 s. The plate is placed back on ice to incubate for 5 minutes, before adding 200 µL of room temperate Super Optimal Catabolite repression (SOC) medium to each well. The plate is incubated at 37° C. with shaking at 200 rpm for 1 h. A multichannel pipet is used to slowly drip 40 µL of each transformation mixture onto a ThermFisher™ OmniTray™ containing selective solid agar medium (LB Kan). Alternatively, 100 µL of transformation mixture is plated on individual petri dishes with selective solid agar medium (Golden Gate assembly, LB-Kan; Gibson assembly, LB Amp). Plates are incubated overnight at 37° C. until colonies appear.

Fermentation

Using known techniques, the synthesized bacteria may be transferred to a bioreactor containing feedstock for fermentation. Under controlled conditions, the bacteria ferment to produce a desired product of interest (e.g., small molecule, peptide, synthetic compound, fuel, alcohol) based upon the assembled DNA.

Other types of microbes can function as platform organisms in industrial biotechnology, including yeasts fermenting sugar compounds into end-products, as well as microalgae via photosynthesis (phototrophic algae) or fermentation (heterotrophic algae).

The bacteria or other cells can be cultured in conventional nutrient media modified as appropriate for desired biosynthetic reactions or selections. Culture conditions, such as temperature, pH and the like, are those suitable for use with the host cell selected for expression, and will be apparent to those skilled in the art. Many references are available for the culture and production of cells, including cells of bacterial, plant, animal (including mammalian) and archaebacterial origin. See e.g., Sambrook, Ausubel (all supra), as well as Berger, *Guide to Molecular Cloning Techniques, Methods in Enzymology* volume 152 Academic Press, Inc., San Diego, Calif.; and Freshney (1994) *Culture of Animal Cells, a Manual of Basic Technique,* third edition, Wiley-Liss, New York and the references cited therein; Doyle and Griffiths (1997) *Mammalian Cell Culture: Essential Techniques* John Wiley and Sons, NY; Humason (1979) *Animal Tissue Techniques, fourth edition* W.H. Freeman and Company; and Ricciardelle et al., (1989) *In Vitro Cell Dev. Biol.* 25:1016-1024, all of which are incorporated herein by reference. For plant cell culture and regeneration, Payne et al. (1992) *Plant Cell and Tissue Culture in Liquid Systems* John Wiley & Sons, Inc. New York, N.Y.; Gamborg and Phillips (eds) (1995) *Plant Cell, Tissue and Organ Culture;* Fundamental Methods Springer Lab Manual, Springer-Verlag (Berlin Heidelberg N.Y.); Jones, ed. (1984) *Plant Gene Transfer and Expression Protocols*, Humana Press, Totowa, N.J. and *Plant Molecular Biology* (1993) R. R. D. Croy, Ed. Bios Scientific Publishers, Oxford, U.K. ISBN 0 12 198370 6, all of which are incorporated herein by reference. Cell culture media in general are set forth in Atlas and Parks (eds.) The Handbook of *Microbiological Media* (1993) CRC Press, Boca Raton, Fla., which is incorporated herein by reference. Additional information for cell culture is found in available commercial literature such as the *Life Science Research Cell Culture Catalogue* from Sigma-Aldrich, Inc (St Louis, Mo.) ("Sigma-LSRCCC") and, for example, *The Plant Culture Catalogue* and supplement also from Sigma-Aldrich, Inc (St Louis, Mo.) ("Sigma-PCCS"), all of which are incorporated herein by reference.

The culture medium to be used should in a suitable manner satisfy the demands of the respective strains. Descriptions of culture media for various microorganisms are present in the "Manual of Methods for General Bacteriology" of the American Society for Bacteriology (Washington D.C., USA, 1981), incorporated by reference herein.

The synthesized cells may be cultured continuously, or discontinuously in a batch process (batch cultivation) or in a fed-batch or repeated fed-batch process for the purpose of producing the desired organic compound. A summary of a general nature about known cultivation methods is available in the textbook by Chmiel (Bioprozeßtechnik. 1: Einführung in die Bioverfahrenstechnik (Gustav Fischer Verlag, Stuttgart, 1991)) or in the textbook by Storhas (Bioreaktoren and periphere Einrichtungen (Vieweg Verlag, Braunschweig/Wiesbaden, 1994)), all of which are incorporated by reference herein.

Classical batch fermentation is a closed system, wherein the composition of the medium is set at the beginning of the fermentation and is not subject to artificial alterations during the fermentation. A variation of the batch system is a fed-batch fermentation. In this variation, the substrate is added in increments as the fermentation progresses. Fed-batch systems are useful when catabolite repression is likely to inhibit the metabolism of the cells and where it is desirable to have limited amounts of substrate in the medium. Batch and fed-batch fermentations are common and well known in the art.

Continuous fermentation is a system where a defined fermentation medium is added continuously to a bioreactor and an equal amount of conditioned medium is removed simultaneously for processing and harvesting of desired biomolecule products of interest. Continuous fermentation generally maintains the cultures at a constant high density where cells are primarily in log phase growth. Continuous fermentation generally maintains the cultures at a stationary or late log/stationary, phase growth. Continuous fermentation systems strive to maintain steady state growth conditions.

Methods for modulating nutrients and growth factors for continuous fermentation processes as well as techniques for maximizing the rate of product formation are well known in the art of industrial microbiology.

For example, a non-limiting list of carbon sources for cellular cultures include, sugars and carbohydrates such as, for example, glucose, sucrose, lactose, fructose, maltose, molasses, sucrose-containing solutions from sugar beet or sugar cane processing, starch, starch hydrolysate, and cellulose; oils and fats such as, for example, soybean oil, sunflower oil, groundnut oil and coconut fat; fatty acids such as, for example, palmitic acid, stearic acid, and linoleic acid; alcohols such as, for example, glycerol, methanol, and ethanol; and organic acids such as, for example, acetic acid or lactic acid.

A non-limiting list of the nitrogen sources include, organic nitrogen-containing compounds such as peptones, yeast extract, meat extract, malt extract, corn steep liquor, soybean flour, and urea; or inorganic compounds such as ammonium sulfate, ammonium chloride, ammonium phosphate, ammonium carbonate, and ammonium nitrate. The nitrogen sources can be used individually or as a mixture.

A non-limiting list of the possible phosphorus sources include, phosphoric acid, potassium dihydrogen phosphate or dipotassium hydrogen phosphate or the corresponding sodium-containing salts.

The culture medium may additionally comprise salts, for example in the form of chlorides or sulfates of metals such as, for example, sodium, potassium, magnesium, calcium and iron, such as, for example, magnesium sulfate or iron sulfate.

Finally, essential growth factors such as amino acids, for example homoserine and vitamins, for example thiamine, biotin or pantothenic acid, may be employed in addition to the abovementioned substances.

In some embodiments, the pH of the culture can be controlled by any acid or base, or buffer salt, including, but not limited to sodium hydroxide, potassium hydroxide, ammonia, or aqueous ammonia; or acidic compounds such as phosphoric acid or sulfuric acid in a suitable manner. In some embodiments, the pH is generally adjusted to a value of from 6.0 to 8.5, preferably 6.5 to 8.

The cultures may include an anti-foaming agent such as, for example, fatty acid polyglycol esters. The cultures may be modified to stabilize the plasmids of the cultures by adding suitable selective substances such as, for example, antibiotics.

The cultures may be carried out under aerobic or anaerobic conditions. In order to maintain aerobic conditions, oxygen or oxygen-containing gas mixtures such as, for example, air, are introduced into the culture. It is likewise possible to use liquids enriched with hydrogen peroxide. The fermentation is carried out, where appropriate, at elevated pressure, for example at an elevated pressure of from 0.03 to 0.2 MPa. The temperature of the culture is normally from 20° C. to 45° C. and preferably from 25° C. to 40° C., particularly preferably from 30° C. to 37° C. In batch or fed-batch processes, the cultivation may be continued until an amount of the desired product of interest (e.g. an organic-chemical compound) sufficient for recovery has formed. This aim can normally be achieved within 10 hours to 160 hours. In continuous processes, longer cultivation times are possible. The activity of the microorganisms results in a concentration (accumulation) of the product of interest in the fermentation medium and/or in the cells of said microorganisms.

Computing Environment

Figure 5:
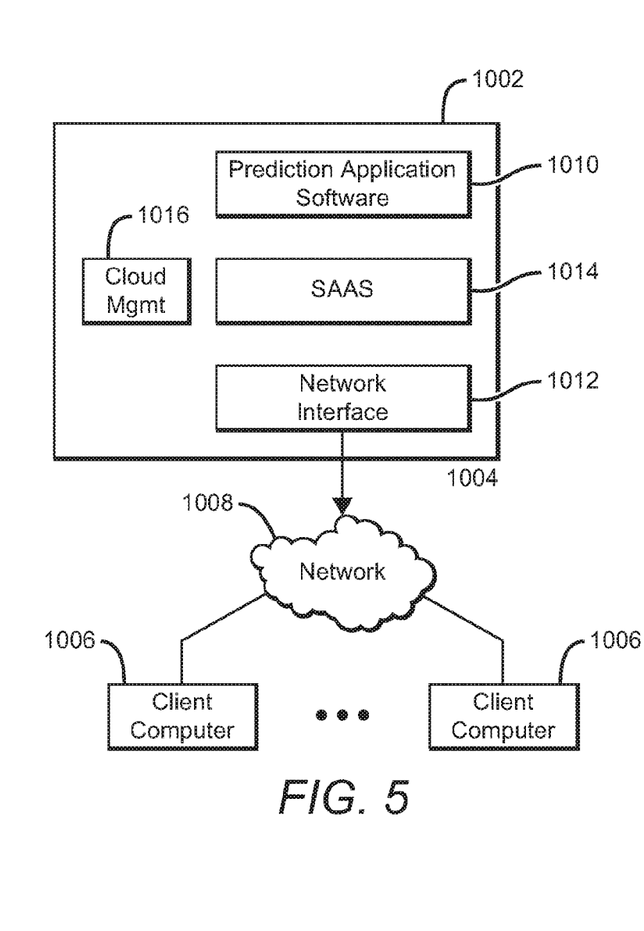
FIG. 5 illustrates a cloud computing environment according to embodiments of the disclosure.

FIG. 5 illustrates a cloud computing environment according to embodiments of the disclosure. In embodiments of the disclosure, software 1010 may be implemented for the tour determination engine or other computer operations disclosed herein in a cloud computing system 1002, to enable users to determine the low-cost sequential ordering of liquid transfers, control the liquid transfers performed by the liquid handler, and perform other computer-implemented operations according to embodiments of the disclosure. Client computers 1006, such as those illustrated in FIG. 6, access the system via a network 1008, such as the Internet. The system may employ one or more computing systems using one or more processors, of the type illustrated in FIG. 6. The cloud computing system itself includes a network interface 1012 to interface the software 1010 to the client computers 1006 via the network 1008. The network interface 1012 may include an application programming interface (API) to enable client applications at the client computers 1006 to access the system software 1010.

A software as a service (SaaS) software module 1014 offers the system software 1010 as a service to the client computers 1006. A cloud management module 1016 manages access to the system 1010 by the client computers 1006. The cloud management module 1016 may enable a cloud architecture that employs multitenant applications, virtualization or other architectures known in the art to serve multiple users.

Figure 6:
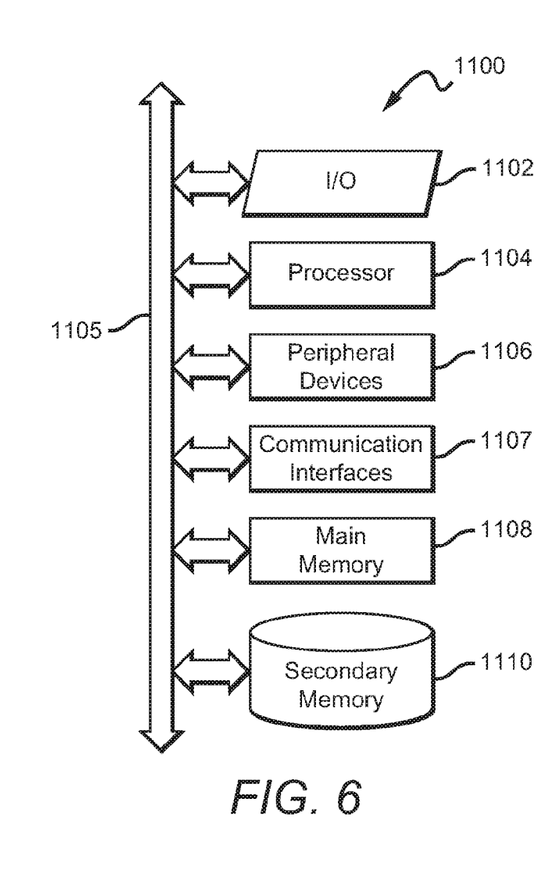
FIG. 6 illustrates an example of a computer system that may be used to execute program code stored in a non-transitory computer readable medium (e.g., memory) in accordance with embodiments of the disclosure.

FIG. 6 illustrates an example of a computer system 1100 that may be used to execute program code stored in a non-transitory computer readable medium (e.g., memory) in accordance with embodiments of the disclosure. The computer system includes an input/output subsystem 1102, which may be used to interface with human users and/or other computer systems depending upon the application. The I/O subsystem 1102 may include, e.g., a keyboard, mouse, graphical user interface, touchscreen, or other interfaces for input, and, e.g., an LED or other flat screen display, or other interfaces for output, including application program interfaces (APIs). Elements of embodiments of the disclosure, such as the tour determination engine 107, client device 210, the controller 109, and the liquid handler 202 may be implemented with a computer system like that of computer system 1100.

Program code may be stored in non-transitory media such as persistent storage in secondary memory 1110 or main memory 1108 or both. Main memory 1108 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 1104 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 1104. The processor(s) 1104 may include graphics processing units (GPUs) for handling computationally intensive tasks.

The processor(s) 1104 may communicate with external networks via one or more communications interfaces 1107, such as a network interface card, WiFi transceiver, etc. A bus 1105 communicatively couples the I/O subsystem 1102, the processor(s) 1104, peripheral devices 1106, communications interfaces 1107, memory 1108, and persistent storage 1110. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 1100. In particular, elements of the tour determination engine 107, the client device 210, the controller 109, the liquid handler 202, and any other automated systems or devices described herein may be computer-implemented. Some elements and functionality may be implemented locally and others may be implemented in a distributed fashion over a network through different servers, e.g., in client-server fashion, for example. In particular, server-side operations may be made available to multiple clients in a software as a service (SaaS) fashion, as shown in FIG. 5.

Those skilled in the art will recognize that, in some embodiments, some of the operations described herein (e.g., moving lab equipment) that do not involve data processing may be performed by human implementation, or through a combination of automated and manual means.

Although the disclosure may not expressly disclose that some embodiments or features described herein (such as those recited in the claims) may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

All references cited herein, including, without limitation, articles, publications, patents, patent publications, and patent applications, are incorporated by reference in their entireties for all purposes, except that any portion of any such reference is not incorporated by reference herein if it: (1) is inconsistent with embodiments of the disclosure expressly described herein; (2) limits the scope of any embodiments described herein; or (3) limits the scope of any terms of any claims recited herein. Mention of any reference, article, publication, patent, patent publication, or patent application cited herein is not, and should not be taken as an acknowledgment or any form of suggestion that it constitutes relevant prior art or forms part of the common general knowledge in any country in the world, or that it discloses essential matter.

In the claims below, a claim n reciting "any one of the preceding claims starting with claim x," shall refer to any one of the claims starting with claim x and ending with the immediately preceding claim (claim n−1). For example, claim 35 reciting "The system of any one of the preceding claims starting with claim 28" refers to the system of any one of claims 28-34.

SELECTED EMBODIMENTS OF THE DISCLOSURE

Each embodiment below corresponds to one or more embodiments of the disclosure. Dependencies below are understood to refer back to embodiments within the same set.

Method Embodiments

Set 1

1. A computer-implemented method for determining a sequential ordering of a plurality of predefined transfers for transferring an object from a plurality of source points of a source array to a plurality of destination points of a destination array, wherein a laboratory automation system includes at least a first component and a second component of the following three components: a source array, a destination array, or an actuator, the method comprising:

a. for each unique transition to a next transfer of the plurality of predefined transfers, wherein each transfer corresponds to a transfer position:
  i. determining a first component travel cost of the first component between a current transfer position and a next transfer position corresponding to the next transfer, wherein
    1. the current transfer position corresponds to positioning of a current source point with respect to a current destination point for a current transfer of the plurality of predefined transfers,
    2. the next transfer position corresponds to positioning of a next source point with respect to a next destination point for the next transfer;
  ii. determining a second component travel cost of the second component between the current transfer position and the next transfer position; and
  iii. determining a transition travel cost, of a plurality of transition travel costs, for the transition as the maximum of the first component travel cost and the second component travel cost; and
b. determining a resolved sequential ordering of the plurality of predefined transfers based at least in part upon the plurality of transition travel costs.
2. The method of embodiment 1, wherein each tour of a plurality of tours comprises a unique sequential ordering of the plurality of predefined transfers, the method further comprising determining a cost of each tour based at least in part upon an aggregate of the transition travel costs for the tour.
3. The method of embodiment 2, wherein the plurality of tours corresponds to all combinations of sequential ordering of the plurality of predefined transfers.
4. The method of any one of the preceding embodiments starting with embodiment 2, wherein the cost of each tour comprises a sum of the transition travel costs for the tour.
5. The method of any one of the preceding embodiments starting with embodiment 2, wherein determining a resolved sequential ordering is based at least in part upon the tour that has the lowest cost.
6. The method of embodiment 1, wherein the first and second components are movable and a third component of the three components remains fixed.
7. The method of any one of the preceding embodiments, wherein each transition travel cost is a distance.
8. The method of any one of the preceding embodiments, wherein each transition travel cost is a function of distance and travel time.
9. The method of any one of the preceding embodiments, wherein the laboratory automation system comprises a liquid handler, and the object is a volume of liquid.
10. The method of any one of the preceding embodiments, wherein positioning comprises alignment.
11. The method of any one of the preceding embodiments, wherein a third component of the three components is also positioned at the next transfer position for the next transfer.
12. The method of any one of the preceding embodiments, wherein determining the resolved sequential ordering of the plurality of predefined transfers comprises solving the traveling salesman problem.
13. The method of any one of the preceding embodiments, wherein the source and destination arrays are plates and the source and destination points are wells.
14. The method of any one of the preceding embodiments, wherein the first and second components are the actuator and the destination plate, respectively.
15. The method of any one of the preceding embodiments, wherein the actuator is an acoustic transducer.
16. The method of any one of the preceding embodiments, further comprising moving the first and second components according to the resolved sequential ordering.
17. The method of any one of the preceding embodiments, wherein the destination array resides in a plane parallel to a plane in which the source array resides.
18. The method of any one of the preceding embodiments, further comprising assembling at least one nucleotide sequence based at least in part upon moving the first and second components according to the resolved sequential ordering.
19. The method of any one of the preceding embodiments, further comprising manufacturing a product of interest based at least in part upon at least one nucleotide sequence assembled by moving the first and second components according to the resolved sequential ordering.
20. A liquid hander of any one of the preceding embodiments in which the first and second components travel according to the resolved sequential ordering.

System Embodiments

Set 1

1. A system for determining a sequential ordering of a plurality of predefined transfers for transferring an object from a plurality of source points of a source array to a plurality of destination points of a destination array, wherein a laboratory automation system includes at least a first component and a second component of the following three components: a source array, a destination array, or an actuator, the system comprising: one or more processors; and
one or more memories operatively coupled to the one or more processors and storing instructions, that when executed by at least one of the one or more processors, cause the system to:
  a. for each unique transition to a next transfer of the plurality of predefined transfers, wherein each transfer corresponds to a transfer position:
    i. determine a first component travel cost of the first component between a current transfer position and a next transfer position corresponding to the next transfer, wherein
      1. the current transfer position corresponds to positioning of a current source point with respect to a current destination point for a current transfer of the plurality of predefined transfers,
      2. the next transfer position corresponds to positioning of a next source point with respect to a next destination point for the next transfer;
    ii. determine a second component travel cost of the second component between the current transfer position and the next transfer position; and
    iii. determine a transition travel cost, of a plurality of transition travel costs, for the transition as the maximum of the first component travel cost and the second component travel cost; and b. determine a resolved sequential ordering of the plurality of predefined transfers based at least in part upon the plurality of transition travel costs.
2. The system of embodiment 1, wherein each tour of a plurality of tours comprises a unique sequential ordering of the plurality of predefined transfers, and a cost of each tour is based at least in part upon an aggregate of the transition travel costs for the tour.
3. The system of embodiment 2, wherein the plurality of tours corresponds to all combinations of sequential ordering of the plurality of predefined transfers.
4. The system of any one of the preceding embodiments starting with embodiment 2, wherein the cost of each tour comprises a sum of the transition travel costs for the tour.
5. The system of any one of the preceding embodiments starting with embodiment 2, wherein determining a resolved sequential ordering is based at least in part upon the tour that has the lowest cost.
6. The system of embodiment 1, wherein the first and second components are movable and a third component of the three components remains fixed.
7. The system of any one of the preceding embodiments, wherein each transition travel cost is a distance.
8. The system of any one of the preceding embodiments, wherein each transition travel cost is a function of distance and travel time.
9. The system of any one of the preceding embodiments, wherein the laboratory automation system comprises a liquid handler, and the object is a volume of liquid.
10. The system of any one of the preceding embodiments, wherein positioning comprises alignment.
11. The system of any one of the preceding embodiments, wherein a third component of the three components is also positioned at the next transfer position for the next transfer.
12. The system of any one of the preceding embodiments, wherein determining the resolved sequential ordering of the plurality of predefined transfers comprises solving the traveling salesman problem.
13. The system of any one of the preceding embodiments, wherein the source and destination arrays are plates and the source and destination points are wells.
14. The system of any one of the preceding embodiments, wherein the first and second components are the actuator and the destination plate, respectively.
15. The system of any one of the preceding embodiments, wherein the actuator is an acoustic transducer.
16. The system of any one of the preceding embodiments, wherein the one or more memories store further instructions that, when executed, cause the system to move the first and second components according to the resolved sequential ordering.
17. The system of any one of the preceding embodiments, wherein the destination array resides in a plane parallel to a plane in which the source array resides.
18. The system of any one of the preceding embodiments, wherein at least one nucleotide sequence is assembled based at least in part upon moving the first and second components according to the resolved sequential ordering.
19. The system of any one of the preceding embodiments, wherein a product of interest is manufactured based at least in part upon at least one nucleotide sequence assembled by moving the first and second components according to the resolved sequential ordering.
20. A liquid hander of any one of the preceding embodiments in which the first and second components travel according to the resolved sequential ordering.

Computer-Readable Medium Embodiments
Set 1
1. One or more non-transitory computer-readable media storing instructions for determining a sequential ordering of a plurality of predefined transfers for transferring an object from a plurality of source points of a source array to a plurality of destination points of a destination array, wherein a laboratory automation system includes at least a first component and a second component of the following three components: a source array, a destination array, or an actuator, wherein the instructions, when executed by one or more computing devices, cause at least one of the one or more computing devices to:
a. for each unique transition to a next transfer of the plurality of predefined transfers, wherein each transfer corresponds to a transfer position:
i. determine a first component travel cost of the first component between a current transfer position and a next transfer position corresponding to the next transfer, wherein
1. the current transfer position corresponds to positioning of a current source point with respect to a current destination point for a current transfer of the plurality of predefined transfers,
2. the next transfer position corresponds to positioning of a next source point with respect to a next destination point for the next transfer;
ii. determine a second component travel cost of the second component between the current transfer position and the next transfer position; and
iii. determine a transition travel cost, of a plurality of transition travel costs, for the transition as the maximum of the first component travel cost and the second component travel cost; and
b. determine a resolved sequential ordering of the plurality of predefined transfers based at least in part upon the plurality of transition travel costs.
2. The one or more non-transitory computer-readable media of embodiment 1, wherein each tour of a plurality of tours comprises a unique sequential ordering of the plurality of predefined transfers, and a cost of each tour is based at least in part upon an aggregate of the transition travel costs for the tour.
3. The one or more non-transitory computer-readable media of embodiment 2, wherein the plurality of tours corresponds to all combinations of sequential ordering of the plurality of predefined transfers.
4. The one or more non-transitory computer-readable media of any one of the preceding embodiments starting with embodiment 2, wherein the cost of each tour comprises a sum of the transition travel costs for the tour.
5. The one or more non-transitory computer-readable media of any one of the preceding embodiments starting with embodiment 2, wherein determining a resolved sequential ordering is based at least in part upon the tour that has the lowest cost.
6. The one or more non-transitory computer-readable media of embodiment 1, wherein the first and second components are movable and a third component of the three components remains fixed.

7. The one or more non-transitory computer-readable media of any one of the preceding embodiments, wherein each transition travel cost is a distance.

8. The one or more non-transitory computer-readable media of any one of the preceding embodiments, wherein each transition travel cost is a function of distance and travel time.

9. The one or more non-transitory computer-readable media of any one of the preceding embodiments, wherein the laboratory automation system comprises a liquid handler, and the object is a volume of liquid.

10. The one or more non-transitory computer-readable media of any one of the preceding embodiments, wherein positioning comprises alignment.

11. The one or more non-transitory computer-readable media of any one of the preceding embodiments, wherein a third component of the three components is also positioned at the next transfer position for the next transfer.

12. The one or more non-transitory computer-readable media of any one of the preceding embodiments, wherein determining the resolved sequential ordering of the plurality of predefined transfers comprises solving the traveling salesman problem.

13. The one or more non-transitory computer-readable media of any one of the preceding embodiments, wherein the source and destination arrays are plates and the source and destination points are wells.

14. The one or more non-transitory computer-readable media of any one of the preceding embodiments, wherein the first and second components are the actuator and the destination plate, respectively.

15. The one or more non-transitory computer-readable media of any one of the preceding embodiments, wherein the actuator is an acoustic transducer.

16. The one or more non-transitory computer-readable media of any one of the preceding embodiments, wherein the computer-readable media store further instructions that, when executed, cause the first and second components to move according to the resolved sequential ordering.

17. The one or more non-transitory computer-readable media of any one of the preceding embodiments, wherein the destination array resides in a plane parallel to a plane in which the source array resides.

18. The one or more non-transitory computer-readable media of any one of the preceding embodiments, wherein at least one nucleotide sequence is assembled based at least in part upon moving the first and second components according to the resolved sequential ordering.

19. The one or more non-transitory computer-readable media of any one of the preceding embodiments, wherein product of interest is manufactured based at least in part upon at least one nucleotide sequence assembled by moving the first and second components according to the resolved sequential ordering.

20. A liquid hander of any one of the preceding embodiments in which the first and second components travel according to the resolved sequential ordering.

What is claimed is:

1. A method for determining a sequential ordering of a plurality of predefined transfers for transferring an object from a plurality of source points of a source array to a plurality of destination points of a destination array, wherein a laboratory automation system includes at least a first component and a second component, different from the first component, wherein the first component and the second component each includes one of the following three components: a source array, a destination array, or an actuator, the method comprising:
   a. for each unique transition to a next transfer of the plurality of predefined transfers, wherein each transfer corresponds to a transfer position:
      i. determining, by at least one processor of one or more processors, a first component travel cost of the first component between a current transfer position and a next transfer position corresponding to the next transfer, wherein
         1. The current transfer position corresponds to positioning of a current source point with respect to a current destination point for a current transfer of the plurality of predefined transfers,
         2. The next transfer position corresponds to positioning of a next source point with respect to a next destination point for the next transfer;
      ii. determining, by at least one processor of one or more processors, a second component travel cost of the second component between the current transfer position and the next transfer position; and
      iii. determining, by at least one processor of one or more processors, a transition travel cost, of a plurality of transition travel costs, for the transition as the maximum of the first component travel cost and the second component travel cost; and
   b. determining, by at least one processor of one or more processors, a resolved sequential ordering of the plurality of predefined transfers based at least in part upon the plurality of transition travel costs; and
   c. moving the first and second components based at least in part upon the resolved sequential ordering.

2. The method of claim 1, wherein each tour of a plurality of tours comprises a unique sequential ordering of the plurality of predefined transfers, the method further comprising determining a cost of each tour based at least in part upon an aggregate of the transition travel costs for the tour.

3. The method of claim 2, wherein the plurality of tours corresponds to all combinations of sequential ordering of the plurality of predefined transfers.

4. The method of claim 2, wherein the cost of each tour comprises a sum of the transition travel costs for the tour.

5. The method of claim 2, wherein determining a resolved sequential ordering is based at least in part upon the tour that has the lowest cost.

6. A method for assembling at least one nucleotide sequence based at least in part upon moving the first and second components according to the resolved sequential ordering determined by the method of claim 1.

7. A method of manufacturing a product of interest based at least in part upon at least one nucleotide sequence assembled by moving the first and second components according to the resolved sequential ordering determined by the method of claim 1.

8. A liquid handler in which the first and second components travel according to the resolved sequential ordering determined by the method of claim 1.

9. A system for determining a sequential ordering of a plurality of predefined transfers for transferring an object from a plurality of source points of a source array to a plurality of destination points of a destination array, wherein a laboratory automation system includes at least a first component and a second component, different from the first component, wherein the first component and the second component each includes one of the following three components: a source array, a destination array, or an actuator, the system comprising:
  one or more memories storing instructions; and
  one or more processors, operatively coupled to the one or more memories, for executing the instructions to cause the system to:
    a. for each unique transition to a next transfer of the plurality of predefined transfers, wherein each transfer corresponds to a transfer position:
      i. determine a first component travel cost of the first component between a current transfer position and a next transfer position corresponding to the next transfer, wherein
        1. The current transfer position corresponds to positioning of a current source point with respect to a current destination point for a current transfer of the plurality of predefined transfers,
        2. The next transfer position corresponds to positioning of a next source point with respect to a next destination point for the next transfer;
      ii. determine a second component travel cost of the second component between the current transfer position and the next transfer position; and
      iii. determine a transition travel cost, of a plurality of transition travel costs, for the transition as the maximum of the first component travel cost and the second component travel cost; and
    b. determine a resolved sequential ordering of the plurality of predefined transfers based at least in part upon the plurality of transition travel costs,
    c. wherein the first and second components are moved based at least in part upon the resolved sequential ordering.

10. The system of claim 9, wherein each tour of a plurality of tours comprises a unique sequential ordering of the plurality of predefined transfers, and a cost of each tour is based at least in part upon an aggregate of the transition travel costs for the tour.

11. The system of claim 10, wherein the plurality of tours corresponds to all combinations of sequential ordering of the plurality of predefined transfers.

12. The system of claim 10, wherein the cost of each tour comprises a sum of the transition travel costs for the tour.

13. The system of claim 10, wherein determining a resolved sequential ordering is based at least in part upon the tour that has the lowest cost.

14. A system for assembling at least one nucleotide sequence based at least in part upon moving the first and second components according to the resolved sequential ordering determined by the system of claim 9.

15. A system for manufacturing a product of interest based at least in part upon at least one nucleotide sequence assembled by moving the first and second components according to the resolved sequential ordering determined by the system of claim 9.

16. A liquid handler for causing the first and second components to travel according to the resolved sequential ordering determined by the system of claim 9.

17. One or more non-transitory computer-readable media storing instructions for determining a sequential ordering of a plurality of predefined transfers for transferring an object from a plurality of source points of a source array to a plurality of destination points of a destination array, wherein a laboratory automation system includes at least a first component and a second component, different from the first component, wherein the first component and the second component each includes one of the following three components: a source array, a destination array, or an actuator, wherein the instructions, when executed by one or more computing devices, cause at least one of the one or more computing devices to:
  a. for each unique transition to a next transfer of the plurality of predefined transfers, wherein each transfer corresponds to a transfer position:
    i. determine a first component travel cost of the first component between a current transfer position and a next transfer position corresponding to the next transfer, wherein
      1. The current transfer position corresponds to positioning of a current source point with respect to a current destination point for a current transfer of the plurality of predefined transfers,
      2. The next transfer position corresponds to positioning of a next source point with respect to a next destination point for the next transfer;
    ii. determine a second component travel cost of the second component between the current transfer position and the next transfer position; and
    iii. determine a transition travel cost, of a plurality of transition travel costs, for the transition as the maximum of the first component travel cost and the second component travel cost; and
  b. determine a resolved sequential ordering of the plurality of predefined transfers based at least in part upon the plurality of transition travel costs,
  c. wherein the first and second components are moved based at least in part upon the resolved sequential ordering.

18. The one or more non-transitory computer-readable media of claim 17, wherein each tour of a plurality of tours comprises a unique sequential ordering of the plurality of predefined transfers, and a cost of each tour is based at least in part upon an aggregate of the transition travel costs for the tour.

19. The one or more non-transitory computer-readable media of claim 18, wherein the plurality of tours corresponds to all combinations of sequential ordering of the plurality of predefined transfers.

20. The one or more non-transitory computer-readable media of claim 18, wherein the cost of each tour comprises a sum of the transition travel costs for the tour.

21. The one or more non-transitory computer-readable media of claim 18 or, wherein determining a resolved sequential ordering is based at least in part upon the tour that has the lowest cost.

22. The one or more non-transitory computer-readable media of claim 17, wherein the first and second components are movable and a third component of the three components remains fixed.

23. The one or more non-transitory computer-readable media of claim 17, wherein each transition travel cost is a distance.

24. The one or more non-transitory computer-readable media of claim 17, wherein each transition travel cost is a function of distance and travel time.

25. The one or more non-transitory computer-readable media of claim 17, wherein the laboratory automation system comprises a liquid handler, and the object is a volume of liquid.

26. The one or more non-transitory computer-readable media of claim 17, wherein positioning comprises alignment.

27. The one or more non-transitory computer-readable media of claim 17, wherein a third component of the three components is also positioned at the next transfer position for the next transfer.

28. The one or more non-transitory computer-readable media of claim 17, wherein determining the resolved sequential ordering of the plurality of predefined transfers comprises solving the traveling salesman problem.

29. The one or more non-transitory computer-readable media of claim 17, wherein the source and destination arrays are plates and the source and destination points are wells.

30. The one or more non-transitory computer-readable media of claim 17, wherein the first and second components are the actuator and the destination plate, respectively.

31. The one or more non-transitory computer-readable media of claim 17, wherein the actuator is an acoustic transducer.

32. The one or more non-transitory computer-readable media of claim 17, wherein the computer-readable media store further instructions that, when executed, cause the first and second components to move according to the resolved sequential ordering.

33. The one or more non-transitory computer-readable media of claim 17, wherein the destination array resides in a plane parallel to a plane in which the source array resides.

34. One or more non-transitory computer-readable media storing instructions for assembling at least one nucleotide sequence based at least in part upon moving the first and second components according to the resolved sequential ordering determined by the one or more non-transitory computer-readable media of claim 17.

35. One or more non-transitory computer-readable media storing instructions for manufacturing a product of interest based at least in part upon at least one nucleotide sequence assembled by moving the first and second components according to the resolved sequential ordering determined by the one or more non-transitory computer-readable media of claim 17.

36. A liquid handler for causing the first and second components to travel according to the resolved sequential ordering determined by the one or more non-transitory computer-readable media of claim 17.

* * * * *